Figure 1:
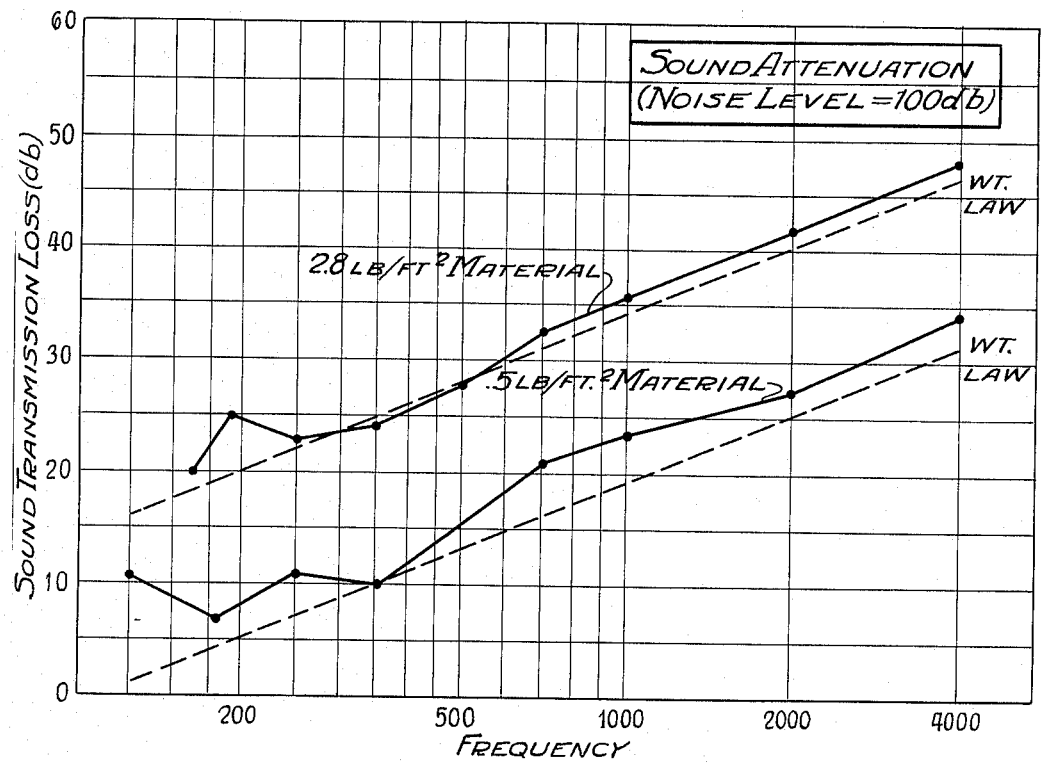

May 31, 1966   J. D. McCLUER ETAL   3,253,947

FLEXIBLE SOUND ATTENUATING MATERIAL

Filed March 3, 1961

INVENTORS.
JOHN D. McCLUER
BY ROBERT C. ROY.

Ward, Neal, Haselton, Orme & McElhannon
ATTORNEYS.

United States Patent Office 3,253,947
Patented May 31, 1966

3,253,947
FLEXIBLE SOUND ATTENUATING MATERIAL
John D. McCluer, Charlotte, N.C., and Robert C. Roy, East Long Meadow, Mass., assignors to H. K. Porter Company, Inc., Trenton, N.J., a corporation of Delaware
Filed Mar. 3, 1961, Ser. No. 93,159
12 Claims. (Cl. 117—126)

This invention is directed to flexible, resilient, yet limp and non-reverberant sound attenuating materials formed on a fabric substrate.

In its broadest aspect, the material product of the present invention comprises a fabric base, preferably an asbestos-base fabric, bearing on at least one of its surfaces an elastomeric film having dispersed therethrough discrete particles of a highly dense solid. The discrete particles are so dispersed as to be essentially disassociated from one another in the elastomeric film or layer, and as such they do not constitute a continuous layer of solid particles. X-ray patterns show discontinuity of particle distribution. It is essential to the excellent sound or vibration attenuating properties of the present product that the particles be dispersed or disassociated from one another and constitute a non-continuous layer as distinguished from a continuous mass or sheet of the material of which the particles are formed. The present product presumably functions so well as an attenuator because the disassociated dense particles permit enough sound transmission to avoid substantial sound pressure build-up on the noise side of the material, and yet the disassociated particles do provide excellent impedance. Limpness of the material product in all dimensions makes it essentially non-resonant.

The elastomeric film serves as a carrier material in which the highly dense discrete particles are randomly dispersed and held in position essentially disassociated from one another, although there may of course be random contact between particles. By reason of the elastomeric or rubber-like properties of the film material, the film containing the discrete solids is resilient and flexible as well as tough, and yet it is limp which enables essentially free motion at all sound frequency levels and sound pressure levels. As such it will not become resonant or act as a sound radiator or magnifier. The discontinuity of dense solid particles therein provides maximum controlled transmission loss between noise source and protected area.

The fabric portion of the material of the present invention serves as a flexible support and as reinforcing means for the elastomeric film containing the dispersed discrete solids. The fabric renders the present product self-supporting, thus enabling use of the material in a variety of intricate designs. Various fabrics may be used to compensate for conditions that exist in particular surroundings in which the material of the present invention is to be employed. For example, asbestos cloth would be used where the fabric support must be flame retardant, or where thermal insulation is desired coincidental with sound attenuation, or where a fibrous backing is desired to provide marginal absorption of sound built up in an enclosure. Other fibers, such as jute, hemp, cotton, wool or synthetics, such as nylon, glass, etc., also woven hardware cloth such as chicken wire, screening, etc., or a combination of wire plied or woven with asbestos or other fibers, may be employed as the base fabric without deterring from the product's normal function of sound attenuation, and in order to provide a material product of improved tensile strength, as may be required in particular installations. The term "fabric" as employed herein is intended to include the presence of such metal elements.

A preferred flexible support or base is an "asbestos-base" fabric, which term as employed herein is intended to mean a fabric containing at least about 50% by weight of asbestos fibers. It may be a woven, knit or felted fabric. A typical asbestos-base fabric for the product of the present invention is one containing about 83% asbestos and the balance other fibers, for example, cotton. Such a material may be flame-proofed in accordance with McCluer U.S. Patents Nos. 2,884,343 and 2,948,641, or such fabrics may be rendered "flame proof and water repellent" as disclosed in McCluer copending application Serial No. 822,997, filed June 26, 1959, now U.S. Patent No. 3,062,678. Flame proofing and water repellency are desirable for most marine applications, and in many instances these preliminary treatments of the fabric support will be mandatory, not for accoustical performance, but for fabric life and environmental safety.

Since the preferred fabric is an asbestos-base material the present invention will be further described with specific reference to the use of this type of support or base.

The elastomeric film serves as a supporting carrier for the discrete dense solid particles, and is a polymer, for example rubber, or latex or one of the synthetic elastomers. While the primary function of this elastomeric film or coating is to hold the discrete dense solid particles in position, it is by its nature also a water repellent, vapor barrier material. The elastomer is preferably a cured vinyl polymer; the term "vinyl" as employed herein to further identify the elastomeric material of the film is intended to designate those polymers containing the ($CH_2$:CH—) radical, and as such also includes derivatives of acrylic acid. Materials of this class which also contain an attached chlorine atom are preferred since chlorine imparts some degree of flame retardancy to the film. A preferred elastomeric material is 2-chloro butadiene-1,3, known as neoprene. When fully polymerized neoprene is highly resistant to acids and most corrosive chemicals, including such hydraulic fluids as "Cellulube 220 and Cellulube 550," and is also flexible over a wide range of temperatures, as are the other vinyl elastomers which may be employed.

In addition to neoprene, other suitable elastomeric materials include vinyl chloride polymer, the copolymer of butadiene and acrylonitrile, preferably copolymerized in the ratio of 55:45, vinyl acetate polymer, vinyl butyrate polymer, the copolymer of vinyl toluene with butadiene, as well as polymers of methyl, ethyl or butyl acrylate, each of which contain the $CH_2$:CH— group, and mixtures thereof, and the copolymer of butadiene and styrene, commonly known as GRS rubber. The above are representative only of the wide variety of suitable vinyl materials. Desirably they may be prepared in the form of an aqueous emulsion to which the finely divided metal is added along with a thickening agent to adjust the viscosity of the emulsion for proper coating. The thickening agent may be an acrylic copolymer, for example, a polymer of sodium acrylate, or a natural gum such as guar or karaya, sodium carboxymethyl cellulose, or any one of the well known thickening agents. These thickened emulsions containing the finely divided lead may be applied to the asbestos-base fabric by conventional methods, for example by spraying, brushing, roll application or with the use of a knife coater and other methods of application.

In addition to the above elastomers, the well known polyurethane foams may also be employed as the carrier for the dense solid particles. This type foam is the product of the reaction between an expansible resin containing the isocyanate group (NCO) and water forming a high molecular weight polymer plus carbon dioxide gas. Due to the high molecular weight of this polymer and its high viscosity, the carbon dioxide gas is trapped and great expansion occurs. This expanded product is known as polyurethane foam and the cell structure of the foam has great strength.

The dense discrete solids which are dispersed in the elastomeric carrier are selected from the group consisting of lead, lead oxide and mixtures thereof. Because of its high density and favorable economic position lead is the preferred material, and for convenience the present invention will be further described with reference to the use of lead.

As noted above, the superiority of the product of the present invention as compared with a fabric, for example, bearing a continuous sheet of metal resides in the discontinuity and fine sub-division of the lead or other solids in the elastomeric film. The discontinuous particles employed herein include solid granules and pellets. The maximum practical particle size is through about 20 Tyler screen mesh. For example, granular or pelletized lead selected such that substantially all of the sample will pass through a 20 mesh screen and be retained by a 60 mesh screen is preferably employed. For example, in 1 lb./ft.² and heavier material products, pellets or granular lead from 20 to 40 mesh approximately is used. A typical Tyler screen analysis of lead pellets or granules for 1 lb./ft.² and heavier material products is as follows:

| | Percent |
|---|---|
| +10 mesh | 0.6 |
| +20 mesh | 35.6 |
| +28 mesh | 55.5 |
| +35 mesh | 6.9 |
| −35 mesh | 1.4 |
| Total | 100.0 |

In preparing the product of the present invention the lead is dispersed throughout a carrier consisting essentially of the elastomeric precondensate, and this mixture is then applied to one or both surfaces of the fabric base by conventional coating techniques. The precondensate and the particulated lead bear definite weight relationships one to the other, with the lead constituting a suitable quantity which with the elastomer will produce a matrix which may be readily applied to the fabric support and also produce the required satisfactory degree of mass and limpness. The lead is present preferably in amounts of about 1 to 15 times the weight of elastomer applied to the fabric, and this ratio also exists in the final product, that is following curing or complete polymerization of the elastomeric material. The quantity of elastomer applied to the fabric is such that it forms at least a continuous film on the fabric. The quantity of finely divided lead and the quantity of the film will of course depend upon the desired weight of the final product.

Typical coating or film carriers, wherein the elastomeric material is in aqueous emulsion are as follows:

*Example 1*

| | Parts by weight |
|---|---|
| Polyvinyl chloride 40% emulsion | 100 |
| Sodium polyacrylate (thickener) | 5 to 10 |
| Lead granules (20 to 35 mesh) | 25 to 400 |
| Chlorinated paraffin (flame retardant) | 10 to 15 |

*Example 2*

| | |
|---|---|
| Polymer of ethyl acrylate 40% emulsion | 100 |
| Sodium carboxymethyl cellulose | 4 to 11 |
| Lead granules (20 to 35 mesh) | 100 to 450 |
| Chlorinated paraffin | 10 to 15 |

*Example 3*

| | |
|---|---|
| 2 chloro butadiene-1,3 40% emulsion | 100 |
| Sodium polyacrylate | 4 to 10 |
| Lead pellets (40 to 60 mesh) | 300 to 500 |
| Antimony oxide (flame retardant) | 5 to 15 |

*Example 4*

| | |
|---|---|
| Copolymer of butadiene and acrylonitrile (40%) | 50 |
| Vinyl chloride polymer (40%) | 50 |
| Sodium polyacrylate | 4 to 10 |
| Lead pellets (20 to 60 mesh) | 300 to 500 |
| Chlorinated paraffin | 10 to 15 |

It is not necessary to employ an aqueous emulsion of the vinyl material for coating purposes, although they are commercially available and their use in such form is convenient. It is also possible to use raw polymers, for example, neoprene which is obtained by polymerizing the monomer to form a white, milky liquid. This is coagulated and is available in the market in solid lumps, as are other polymers. The following examples are illustrative of coating compositions containing raw solid vinyl materials:

*Example 5*

| | Parts by weight |
|---|---|
| Neoprene WRT (2 chloro butadiene-1,3) (solid lumps) | 100 |
| Granular lead, 20–35 mesh | 800 |
| Chlorinated paraffin (flame retardant) | 15 |
| MgO | 4 |
| ZnO (curing agent and free $Cl_2$ acceptor) | 5 |
| Stearic acid | 1 |
| NA22 (2 mercapto imidazolene accelerator) | 0.5 |
| Hard clay | 50 |
| Butyl oleate (low temperature plasticizer) | 20 |

*Example 6*

| | |
|---|---|
| Geon 121 paste resin (polymer of polyvinyl chloride) | 100 |
| Lead pellets, minus 40 plus 60 mesh | 800 |
| Tritolyl phosphate (flame retardant) | 33 |
| Di-2-ethyl hexyl phthalate (plasticizer) | 33 |
| Basic lead carbonate (stabilizer) | 1.7 |

Examples 5 and 6 are illustrative of vinyl compounds which must be compounded on rubber mills, for example, a two-roll or a Banbury mill, where the vinyl material is worked and where all of the additives, including the lead, are blended to form a homogeneous mass. After working the vinyl-lead material is applied to the fabric, preferably using a three roll calender which friction coats the material to the fabric.

Following coating with the vinyl-lead composition, whether a solid mixture or an emulsion, the vinyl material is cured at the equivalent of about 300° F. for at least 30 minutes. For example the coated fabric may be dried, rolled up in 10 yard rolls on a hollow core, interleafed with cotton or rayon fabric dusted with talc to prevent sticking, and the roll placed in an oven at about 200° F. for about 48 hours. Since this is a rather time-consuming and inefficient method for curing, we have developed a more rapid and satisfactory method, making use of a steam heated platen press somewhat wider than the width of the coated fabric and approximately 10 yards long. The fabric is coated at a three-rolled friction calender in ten yard lengths, rolled up temporarily, using polyethylene for interleafing to prevent sticking, and then transferred to the platen press. Here the cloth is unrolled and laid flat on the bottom plate of the press which was previously heated to about 310° F., with the coated side up, and the polyethylene is removed. The top plate of the press can remain in raised position approximately eleven inches above the coated fabric. The coating is thus heated by conduction through the fabric from the bottom plate and by radiation from the top plate. After about 40 minutes of such heat treatment, the vinyl material is fully cured.

It will be noted that in each of the examples a flame retardant has been included in the coating composition. For this purpose chlorinated paraffin is an excellent material and is compatible with very nearly all of the emulsions and solid vinyl coating compositions. The application of a flame-proofing agent during compounding of the vinyl-lead mixture permits the use of substantially less flame-proofing agent where the fabric support is to be flame proofed, thus contributing to the pliability or flexibility of the fabric itself.

A typical heavy flexible sound attenuating material in accordance with the present invention weighs between about 2 and 4 lbs./ft.$^2$. It has an overall thickness of the order of about 0.1–0.4″, with the thickness of the uncoated asbestos-base fabric support being only between about 0.04 and 0.10″. A typical light material product weighs between about 0.5 and 2 lbs./ft.$^2$ and has an overall thickness of between about 0.04 and 0.15″, of which the uncoated asbestos-base fabric support constitutes only about 0.02 to 0.05″.

The flexible sound attenuating material product of the present invention consists essentially of about 5 to 40% of a fabric base, preferably an asbestos-base fabric which has been rendered flame retardant and water repellent, which fabric base is coated on at least one surface with between about 4 and about 30% of a continuous cured elastomeric polymer film containing dispersed therethrough about 25 to 90% of finely divided lead of a particle size of about 20 to about 60 mesh, based on the total weight of the product. The following table sets forth the overall composition of typical heavy and typical light products. The particular elastomeric film employed in these representative coated fabrics is neoprene (2-chlorobutadiene-1,3 polymer). A range of percent of each of the important constituents together with the preferred content of the constitutents set forth. The table includes materials produced with both an aqueous emulsion and raw neoprene.

The sound attenuating properties of a typical flexible material of the present invention comprising an asbestos-base fabric with a single granular lead in neoprene film are amply illustrated in the following table, which also contains comparative data on a commercial installation consisting of ⅜″ gypsum board over 1¼″ fiberglass ceiling board plus a 3″ air or fibrous material space. The present product was oriented with the granular lead-containing film away from the sound source. The efficiency of these materials as respects sound attenuation was measured and expressed as sound transmission loss in decibels. The greater the transmission loss through the material, the more effective it is as a sound barrier. The noise level was 100 db at all frequencies.

TABLE II.—SOUND TRANSMISSION LOSS IN DECIBEL

| Sound frequency, cycles/sec. | Product of present invention 0.2–0.25″ thick—2.5–3.0 lbs./sq. ft. | ⅜″ Gypsum board over 1¼″ fiberglass ceiling board plus 3″ air or fibrous material |
|---|---|---|
| 125 | 20 | 20 |
| 177 | 25 | |
| 250 | 23 | 24 |
| 354 | 24 | |
| 500 | 28 | 24 |
| 707 | 33 | |
| 1,000 | 36 | 35 |
| 2,000 | 42 | 38 |
| 4,000 | 48 | 37 |

Thus it is seen that the flexible, limp material of the present invention is a substantially better sound attenuator than the rigid bulky material at higher frequencies and as good as the commercially available combination at lower frequencies.

TABLE I

| Component | Aqueous emulsion of neoprene used to form the matrix for the lead metal | | | | Raw neoprene lumps used to form the matrix for the lead metal | | | |
|---|---|---|---|---|---|---|---|---|
| | Typical coated heavy fabric— | | Typical coated light fabric— | | Typical coated heavy fabric— | | Typical coated light fabric— | |
| | 2.50 lbs./sq. ft. approx. | | 1.0 lb./sq. ft. approx. | | 2.50 lbs./sq. ft. approx. | | 1.0 lb./sq. ft. approx. | |
| | Preferred | Range | Preferred | Range | Preferred | Range | Preferred | Range |
| | Percent | Percent | Percent | Percent | Percent | Percent | Percent | Percent |
| Fabric | 8.78 | 5–16 | 23.00 | 12–36 | 8.80 | 5–16 | 21.90 | 15–30 |
| Flame retardant | 0.80 | 0.5–1.2 | 2.11 | 1–3 | 0.80 | 0.4–1.6 | 2.00 | 1–3 |
| Texture imparting agent | 0.12 | 0.06–0.2 | 0.39 | 0.2–0.6 | 0.12 | 0.05–0.3 | 0.30 | 0.1–0.4 |
| Plasticizer | 0.20 | 0.1–0.3 | 0.59 | 0.4–0.8 | 0.20 | 0.1–0.4 | 0.50 | 0.2–0.8 |
| Polyhexymethyldisiloxane | 0.08 | 0.04–0.12 | 0.29 | 0.1–0.4 | 0.08 | 0.04–0.16 | 0.20 | 0.1–0.3 |
| 2-chloro-butadiene 1,3 polymer | 9.80 | 5–15 | 8.00 | 4–16 | 9.09 | 5–16 | 7.50 | 4–15 |
| Sodium polyacrylate | 0.30 | 0.1–0.5 | 0.27 | 0.1–0.5 | 0.04 | 0.01–0.10 | 0.10 | 0.05–0.2 |
| Granular lead 20–60 mesh | 78.30 | 55–90 | 64.00 | 30–80 | 72.25 | 50–90 | 60.30 | 30–80 |
| MgO | 0.00 | | 0.00 | | 0.40 | 0.1–0.8 | 0.30 | 0.1–0.5 |
| ZnO | 0.00 | | 0.00 | | 0.44 | 0.1–0.9 | 0.38 | 0.2–0.5 |
| Chlorinated paraffin | 1.62 | 0.8–3.2 | 1.35 | 0.6–3.0 | 1.36 | 0.5–3.0 | 1.13 | 0.5–3.0 |
| Stearic acid | 0.00 | | 0.00 | | 0.08 | 0.04–0.2 | 0.08 | 0.04–0.2 |
| Na22 (2 mercaptaimidazolene) | 0.00 | | 0.00 | | 0.04 | 0.01–0.08 | 0.04 | 0.01–0.08 |
| Hard clay | 0.00 | | 0.00 | | 4.50 | 2–8 | 3.75 | 2–8 |
| Butyl oleate | 0.00 | | 0.00 | | 1.80 | 0.8–2.5 | 1.52 | 0.8–2.5 |
| Product thickness | | 0.12–0.3 | | 0.04–0.15 | | 0.12–0.3 | | 0.04–0.15 |
| Product weight (lbs./sq. ft.) | | 2.25–3.0 | | 0.75–1.50 | | 2.25–3.0 | | 0.75–1.50 |

The product of the present invention in addition to its sound attenuating properties, which are described in detail hereinafter, is highly flexible, even though it bears a substantial quantiy of lead in the outer coating. The product can be easily creased upon itself. In fact, the product may be creased sharply through an angle of 180° following cooling to a temperature of about −20° F., and maintained at this temperature in creased condition for substantial periods of time, and yet upon uncreasing the material shows no sign of cracking. The product retains its excellent resistance to cracking upon creasing even when subjected to temperatures of the order of −50° F. Its excellent flexibility and crease resistance enable it to be easily rolled and applied over odd or irregularly shaped surfaces.

From the above it can be seen that there is no intermediate adhesive between the fabric support and the elastomeric film carrying the finely divided dense solid particles. This is a distinct advantage since most known adhesives harden with age, which would greatly reduce the value of the novel product by making it stiff and destroying its limpness. Furthermore, a stiff adhesive film will cause undesirable reverberation of the product.

However, in a preferred embodiment of the product of the present invention between the fabric support and the elastomeric film carrying the discrete dense solids there is disposed a very thin dried and cured vinyl polymer film. While this intermediate coating or film is not essential to functioning of the present product as a sound attenuator, it has been found that a preliminary very thin flash coating renders the fabric base more compatible with the subsequently applied heavy elastomeric film and results in a better bond between the fabric and the solid-carrying elastomer. The flash coating is not an adhesive. For the flash coating an aqueous dispersion of latex or one of the vinyl polymers mentioned above is preferred. Typical materials include polyvinyl acetate, the copolymer of butadiene and acrylonitrile, 2-chloro butadiene-1,3 or the polymer of ethyl acrylate. The flash coating is applied by any conventional coating means, such as a roll applicator, and is fully dried and cured before the subsequent relatively heavier elastomeric film is applied. This flash coating is very light, and its application is further described in the aforesaid U.S. Patent No. 3,062,678. This material is preferably the same as the outer elastomeric film.

From FIG. 1 which is a logarithmic plot of sound transmission loss in decibels against sound frequency in cycles/second, it can be seen that the actual test data on 0.5 and 2.8 lb./ft.$^2$ flexible material products of the present invention very nearly exactly follow the weight law for sound transmission loss or attenuation.

The particle size of the discrete dense solid particles, whether pellets or granules, is adjusted to the mass build up required to successfully attenuate various frequencies at various noise pressure levels with larger particles being employed in the heavier materials, as noted earlier herein. Based on noise level and frequency range, various weights per square foot of the material of the present invention are required to give the attenuation desired. For example, with a 100 decibel noise level at 4000 c.p.s. the 2.8 pound product will provide attenuation or transmission loss of approximately 48 db. At the same noise level and frequency ½ pound material will provide attenuation of approximately 32 db. The choice of the weight of the material product will be determined by how much transmission loss is desired or required.

Figure 2:
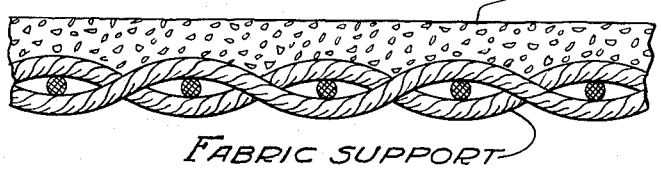

FIG. 2 illustrates a very greatly enlarged section through a typical flexible sound attenuating material product of the present invention.

The flexible material product of the present invention performs to attenuate sound and inaudible vibration with substantially equal facility and is permanently non-resonant at skin temperatures ranging between about −30° F. and 400° F., and also retains its flexibility and resilience over this temperature range. The material is self-supporting and fits the contour of any object. It is thus easily installed over irregular geometric surfaces. By reason of its slight thickness it can be easily applied in multiple layers where noise pressure levels may require, desirably employing dead air or fibrous material between layers. The material can be easily removed from an installation, rolled up and stored indefinitely without deterioration, and subsequently reused.

Where segments of the present material are jointed together a calking compound chemically similar to the elastomeric material of the film, preferably although not necessarily containing finely divided lead dispersed therethrough, can be used to seal any joints or cracks, without permitting more transmission of sound through the joint or calked area than through the main body of the product.

The material of the present invention may be employed in a wide variety of forms for example as hoods, curtains, folding doors, panels, or sound transmission loss rugs. It may be applied to ventilation ducts, or over machinery housings or turbine hoods, or such latter enclosures may be constructed of the novel product, and by reason of its moisture vapor impermeability it is exceedingly well suited to application around steam, air, hydraulic and cold fluid lines.

An obvious use for the material of the present invention is in combination with a mass of sound absorbing fibrous material, and the present invention contemplates such a sound absorbing combination member, for example a flexible panel or bat having a mass of fibrous sound absorbing material, for example glass wool, amosite, felt, jute, etc. positioned intermediate outer layers of the present flexible sound attenuating material. In this instance the flexible material will perform as a septum loading member.

The novel flexible sound attenuating product of the present invention is not to be confused with the flame-retardant vapor barrier fabric of U.S. Patent No. 3,062,678. In one embodiment of the invention therein described, a small quantity of a finely divided inorganic material, e.g., aluminum, is employed in the vinyl polymer film in order to enhance the abrasion resistance of the fabric surface coated with such polymer. The use of finely divided material therein is limited to about 0.3 to 3% by weight of the finished fabric product, and that product is not useful as a sound attenuating material.

We claim:
1. A flexible sound attenuating material comprising a fabric base bearing on at least one surface a continuous elastomeric film containing randomly dispersed therethrough at least about 25 parts per 115 parts by weight of said film of discrete particles of a highly dense solid selected from the group consisting of lead, lead oxide and mixtures thereof of from about 20 to about 60 mesh, said material characterized by its limpness and by being substantially non-resonant.

2. A flexible sound attenuating material comprising a fabric base, an elastomeric film adhering to at least one surface of said fabric base, said film having randomly dispersed therethrough at least about 1 to 15 times its weight of discrete highly dense solid particles selected from the group consisting of lead, lead oxide and mixtures thereof of about 20 to about 60 mesh, said material characterized by its limpness and by being substantially non-resonant.

3. A flexible sound attenuating material comprising a fabric base, an elastomeric film directly adhering to at least one surface of said fabric base, and discrete metal particles selected from the group consisting of lead, lead oxide and mixtures thereof of about 20 to about 60 mesh randomly dispersed throughout said film, said metal particles constituting a discontinuous phase in said film and comprising at least about 1 to 15 times the weight of said film, said material characterized by its limpness and by being substantially non-resonant.

4. A flexible sound attenuating material comprising a fabric base, an elastomeric vinyl polymer film directly-adhering to at least one surface of said fabric base, and discrete lead particles of about 20 to 60 mesh randomly dispersed throughout said film comprising at least about 1 to 15 times the weight of said film, said material characterized by its limpness and by being substantially non-resonant.

5. A material as set forth in claim 4 wherein the elastomeric film also contains a flame-proofing agent.

6. A material as set forth in claim 4 wherein the elastomeric film also contains pigmenting solids.

7. A material as set forth in claim 4 wherein the lead particles constitute between about 25 and 90% by weight of the product.

8. A flexible sound attenuating material comprising about 5 to 40% of a flexible fabric base, about 4 to 30% of an elastomeric polymer in film form adhered thereto, and about 25 to 90% of discrete dense solid particles selected from the group consisting of lead, lead oxide and mixtures thereof, of about 20 to 60 mesh randomly dispersed throughout said elastomeric polymer, said percentages being based upon the total weight of the product, said material characterized by its limpness and by being substantially non-resonant.

9. A flexible sound attenuating material as set forth in claim 8 including also a thin film of a cured elastomeric vinyl polymer intermediate said fabric and the film bearing the discrete dense solid particles.

10. A flexible sound attenuating material comprising about 5 to 40% of an asbestos-base fabric, about 4 to 30% of an elastomeric vinyl polymer in film form adhered thereto, and about 25 to 90% of discrete particles of lead of about 20 to about 60 mesh randomly dispersed throughout said film, said percentages being based upon the total weight of the product, said material characterized by its limpness, and by being substantially non-resonant.

11. A flexible sound attenuating material comprising about 12 to 36% of an asbestos-base fabric, about 4 to 16% of an elastomeric vinyl polymer in film form adhered thereto, and about 25 to 80% of discrete particles of lead of about 20 to about 60 mesh randomly dispersed throughout said film, said percentages being based upon the total weight of the product, said material characterized by its limpness, and by a density of about 0.5 to 1.75 lbs./ft.$^2$.

12. A flexible sound attenuating material comprising about 5 to 16% of an asbestos-base fabric, about 5 to 16% of an elastomeric vinyl polymer in film form adhered thereto, and about 50 to 90% of discrete particles of lead of about 20 to about 60 mesh randomly dispersed throughout said film, said percentages being based upon the total weight of the product, said material characterized by its limpness, and by a density exceeding about 1.75 lbs./ft.$^2$.

References Cited by the Examiner

UNITED STATES PATENTS

| | | | |
|---|---|---|---|
| 2,111,326 | 3/1938 | Norris | 20—4 |
| 2,328,105 | 8/1943 | Strobino | 118—33.11 |
| 2,788,291 | 4/1957 | Stertz | 117—71 |
| 2,877,532 | 3/1959 | Heine | 181—33 |
| 2,931,736 | 4/1960 | Park | 117—126 |
| 2,999,041 | 9/1961 | Lappala | 181—33.1 |
| 3,051,260 | 8/1962 | Eckel | 181—33.1 |
| 3,079,277 | 2/1963 | Painter | 117—121 |
| 3,130,700 | 4/1963 | Peterson | 181—33.11 |

OTHER REFERENCES

Article in "Automotive Industries," Sept. 1, 1959, p. 31.

Allison, D. "Acoustics for Modern Interiors," article in Architectural Forum, vol. 110, April 1959, pp. 145–149, 218.

Architectural Forum, vol. III, No. 4, October 1959, pp. 63 and 64.

RICHARD D. NEVIUS, *Primary Examiner.*

JOSEPH B. SPENCER, *Examiner.*